United States Patent
Mishra et al.

(10) Patent No.: US 12,476,899 B2
(45) Date of Patent: Nov. 18, 2025

(54) CONSTRAINT-BASED UNDERLAY TREE ALLOCATION FOR DATA CENTERS

(71) Applicant: Cisco Technology, Inc., San Jose, CA (US)

(72) Inventors: Mankamana Prasad Mishra, San Jose, CA (US); Lukas Krattiger, The Woodlands, TX (US); Shyam Nayan Kapadia, San Jose, CA (US); Nitin Kumar, San Jose, CA (US)

(73) Assignee: Cisco Technology, Inc., San Jose, CA (US)

( * ) Notice: Subject to any disclaimer, the term of this patent is extended or adjusted under 35 U.S.C. 154(b) by 483 days.

(21) Appl. No.: 17/858,215

(22) Filed: Jul. 6, 2022

(65) Prior Publication Data

US 2023/0130631 A1   Apr. 27, 2023

Related U.S. Application Data

(60) Provisional application No. 63/271,424, filed on Oct. 25, 2021.

(51) Int. Cl.
*H04L 45/16* (2022.01)
*H04L 45/02* (2022.01)

(52) U.S. Cl.
CPC .............. *H04L 45/16* (2013.01); *H04L 45/02* (2013.01)

(58) Field of Classification Search
CPC .......... H04L 45/16; H04L 45/02; H04L 45/48
USPC ....................................................... 370/254
See application file for complete search history.

(56) References Cited

U.S. PATENT DOCUMENTS

| | | | |
|---|---|---|---|
| 7,519,010 B1 | 4/2009 | Aggarwal et al. | |
| 7,830,787 B1* | 11/2010 | Wijnands | H04L 12/18 370/230.1 |
| 2007/0274235 A1* | 11/2007 | Boers | H04L 12/66 370/256 |
| 2012/0057594 A1 | 3/2012 | Boers et al. | |

(Continued)

FOREIGN PATENT DOCUMENTS

| | | |
|---|---|---|
| CN | 103491015 A | 1/2014 |
| EP | 2031796 A1 | 3/2009 |
| WO | WO2018193285 A1 | 10/2018 |

OTHER PUBLICATIONS

The PCT Search Report and Written Opinion mailed Feb. 15, 2023 for PCT application No. PCT/US2022/047684, 12 pages.

*Primary Examiner* — Ricardo H Castaneyra
(74) *Attorney, Agent, or Firm* — Lee & Hayes, P.C.

(57) ABSTRACT

In an example method, a head node connected to a source device transmits a multicast data flow from the source device to receiving devices connected to tail nodes using Default MDT. The example method further includes determining that requirements have been met to begin transmitting the multicast data flow using Data MDT. The method may further include determining whether the tail nodes are able to receive the multicast data flow using Data MDT. In response to determining that all the tail nodes are able to receive the multicast data flow using Data MDT, switch to transmitting the multicast data flow to the tail nodes using Data MDT. In response to determining that at least one of the tail nodes is unable to receive the multicast data flow using the Data MDT, continue transmitting the multicast data flow using Data MDT.

20 Claims, 7 Drawing Sheets

(56) References Cited

U.S. PATENT DOCUMENTS

| | | | |
|---|---|---|---|
| 2014/0003281 A1* | 1/2014 | Han | H04L 12/18 |
| | | | 370/390 |
| 2017/0288890 A1 | 10/2017 | Chai | |
| 2017/0289217 A1* | 10/2017 | Kebler | H04L 45/033 |
| 2019/0372877 A1 | 12/2019 | Nainar et al. | |
| 2020/0044957 A1 | 2/2020 | Allan | |

* cited by examiner

| PEER | MAXIMUM DATA MDT TUNNELS |
|---|---|
| HEAD NODE 302 | 100 |
| TAIL NODE 304 | 50 |
| TAIL NODE 306 | 75 |
| TAIL NODE 308 | 60 |
| TAIL NODE 310 | 0 |

FIG. 3B

| PEER | DATA MDT CAPABILITY |
|---|---|
| HEAD NODE 302 | TRUE |
| TAIL NODE 304 | TRUE |
| TAIL NODE 306 | TRUE |
| TAIL NODE 308 | TRUE |
| TAIL NODE 310 | FALSE |

FIG. 3A

|  | Leaf Node 410 | Leaf Node 412 | Leaf Node 414 | Leaf Node 416 | Leaf Node 418 |
|---|---|---|---|---|---|
| Data MDT Tunnel 402 | 1 | 0 | 1 | 0 | 0 |
| Data MDT Tunnel 404 | 0 | 1 | 1 | 1 | 1 |
| Data MDT Tunnel 406 | 1 | 1 | 0 | 1 | 0 |
| Data MDT Tunnel 408 | 1 | 1 | 1 | 1 | 0 |

| (S,G) 420 | 1 | 1 | 0 | 1 | 0 |

CONSTRAINT-BASED UNDERLAY TREE ALLOCATION FOR DATA CENTERS

RELATED APPLICATIONS

This application claims priority to U.S. Provisional Patent Application No. 63/271,424, filed on Oct. 25, 2021, the entire contents of which are incorporated herein by reference.

TECHNICAL FIELD

The present disclosure relates generally to optimizing mapping overlay multicast data flows to underlay MDTs and providing techniques for a head end router and tail end routers in a network to exchange information relating to capabilities for supporting Data MDT. BACKROUND When multicast data traffic is transmitted on a network, a connectivity is formed on the network between a head node attached to a multicast source where the data originates, and one or more tail nodes attached to multicast receivers that subscribe to the group. In a multicast group each leaf provider edge (PE) router is provisioned with multiple VRF, where each VRF may have associated multicast data flows. A Multicast Distribution Tree (MDT) is formed, where the root is the head node, and the tail nodes are the leaves of the multicast tree. Two types of MDTs are used to transport customer multicast traffic, Default MDT and Data MDT. Typically, Default MDT is used to send low-bandwidth multicast traffic of traffic that is destined to a widely distributed set of receivers such as control traffic between PE routers. When a virtual routing and forwarding (VRF) is multicast enabled, it must also be associated with a Default MDT. A PE router builds a Default MDT to peer PE routers. Any multicast data traffic offered to the Default MDT is distributed to all PE routers that are part of the multicast domain, regardless of whether active receivers are in a VRF at that PE router. For applications that have sparsely distributed receivers, this can pose the problem of unnecessary flooding to dormant PE routers. When the multicast data traffic is sent on Default MDT, PE routers that have no receivers that subscribe to the group, will drop all the packets. To address this situation, a special MDT group called a Data MDT can be instantiated to minimize the flooding by sending data only to PE routers that have active multicast virtual private network (MVPN) receivers. The Data MDT is generally used to tunnel high bandwidth source traffic to interested PE routers, only PE routers that subscribe to the receiver group. The Data MDT is instantiated dynamically when a requirement for Data MDT creation is met, for instance, if a particular multicast data stream exceeds a bandwidth threshold. Once the threshold is exceeded, the PE router that is connected to the MVPN source, the head node of the multicast data traffic, can switch the source, group (S,G) from the Default MDT to a Data MDT. Each VRF can have one or more Data MDT groups allocated to it. When a head node PE router instantiates a Data MDT, the head node PE router must inform all other PE routers, the tail nodes, in the multicast domain that the Data MDT has been instantiated by transmitting a Data MDT join message on the Default MDT containing the (S,G) to Data MDT group mapping. Any tail node PE router that has subscribing receivers, then needs to issue a join message for the Data MDT. The head node PE router that is connected to the MVPN source instantiates as many Data MDT trees as it is capable of with no regard to whether tail node PE routers with subscribing receivers are capable of supporting any Data MDT, or capable of supporting additional Data MDT. Thus, a head node PE router connected to the MVPN source may instantiate more Data MDT tunnels than what a tail node PE router with subscribing receivers can support. This results in "black-holing" where a tail node PE router suddenly stops getting the multicast data traffic to which its receiver subscribes. In situation like this, a whole site may suffer a service outage. Thus, a way to ensure that a leaf PE device is capable of receiving Data MDT traffic is needed.

Additionally, when multicast data traffic is transmitted on a network, the network consists of an underlay network and an overlay network. The underlay network consists of the physical infrastructure and devices (e.g., routers, switches, etc.) above which the overlay network is built. The overlay network is a virtual network that is built on top of underlying hardware devices and designed to provide more scalability than the underlay network. Overlay multicast groups may number in a few thousand to hundreds of thousands. In contrast, the total number of MDTs available in the underlay network is very limited, typically the number is 128, but not more than 512. Thus, typically there are only 128 underlay MDTs available to deliver thousands of overlay multicast data flows. This results in the need for each underlay MDT tunnel to carry more than one overlay multicast data flow. Therefore, a source device is going to allocate multiple overlay flows onto a single underlay MDT and send traffic through a tunnel. Typically, the method for assigning an overlay multicast data flow to an underlay MDT is round robin. For example, if there are 1000 overlay multicast data flows which need to be assigned to 128 underlay MDTs, flow 1 will be mapped to Data MDT-1, flow 2 to Data MDT-2, etc. until flow 129 will be mapped back to Data MDT-1. When using round robin to assign an overlay multicast data flow to an underlay MDT, there is a high probability that the result will be that each leaf PE router will be subscribing to each Data MDT and will get traffic for which it does not have a local subscribing receiver. This results in unnecessary bandwidth consumption where packets are routed to leaf PE routers that have no subscribing receivers, and the packets get dropped. Further when unwanted traffic is received, the receiving PE router must determine whether to accept or reject the packet, resulting in unnecessary extra processing for the PE router when a packet is to be dropped. Thus, there is a need to allocate Data MDT which avoids the use of unnecessary extra bandwidth as much as possible, and to periodically evaluate Data MDT assignments and adjust them to optimize the resources without traffic disruption.

BRIEF DESCRIPTION OF THE DRAWINGS

The detailed description is set forth below with reference to the accompanying figures. In the figures, the left-most digit(s) of a reference number identifies the figure in which the reference number first appears. The use of the same reference numbers in different figures indicates similar or identical items. The systems depicted in the accompanying figures are not to scale and components within the figures may be depicted not to scale with each other.

FIG. 3A illustrates an example table depicting Data MDT capability for a head node and multiple rail nodes in a multicast domain.

FIG. 3B illustrates an example table depicting the maximum Data MDT tunnels each node in a multicast domain are capable of supporting.

DESCRIPTION OF EXAMPLE EMBODIMENTS

Overview

Figure 1:
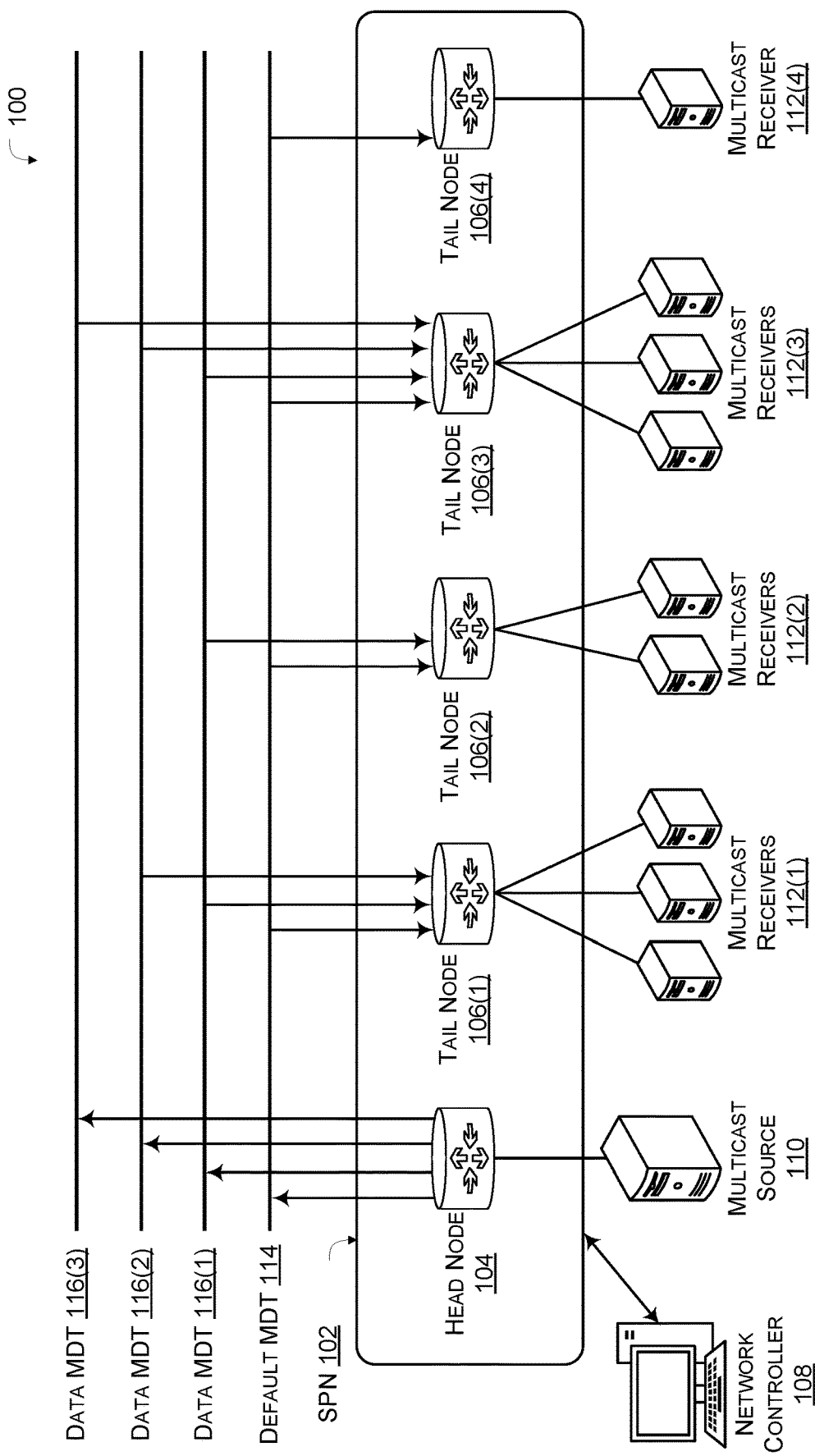
FIG. 1 illustrates an example multicast enabled network environment with a Default MDT, several Data MDT and a network controller.

This disclosure describes various implementations for optimizing mapping overlay multicast data flows to underlay MDTs and providing techniques for a head end router and tail end routers in a network to exchange information relating to capabilities for supporting Data MDT. Examples described herein provide a method including transmitting, by a head node connected to a source device, a multicast data flow from the source device to receiving devices connected to tail nodes using Default Multicast Distribution Tree (MDT). The method further includes determining that requirements have been met to begin transmitting the multicast data flow using Data MDT. Further the method includes determining whether the tail nodes are able to receive the multicast data flow using Data MDT. Further the method includes, in response to determining that all the tail nodes are able to receive the multicast data flow using Data MDT, switch to transmitting the multicast data flow to the tail nodes using Data MDT, or in response to determining that at least one of the tail nodes is unable to receive the multicast data flow using the Data MDT, continue transmitting the multicast data flow using Default MDT.

In some instances, the method may also include determine whether a flag is set in an Inclusive-Provider Multicast Service Interface Boarder Gateway Protocol (I-PMSI BGP) message from each tail node, the flag indicating whether each tail node supports Data MDT.

In various examples, the method may include determining that the flag in an I-PMSI BGP message from at least one tail node is not set, and continuing to transmit the multicast data flow using Default MDT.

In some implementations may include determining from an I-PMSI BGP message from each tail node, a maximum number of Data MDT tunnels each tail node is capable of supporting.

Some examples also include determining that each tail node is currently not using a maximum number of Data MDT tunnels that each tail node is capable of supporting, and switching from transmitting the multicast data flow using Default MDT to transmitting the multicast data flow using Data MDT.

In various instances the method also includes determining that at least one tail node is currently using a maximum number of Data MDT tunnels that the at least one tail node is capable of supporting, and continuing to transmit the multicast data flow using Default MDT.

In some instances, the method also includes determining a maximum number of Data MDT tunnels that the head node can instantiate, based on a number of available Data MDT tunnels a tail node with a lowest capacity of available Data MDT tunnels, has been instantiated, and continuing to transmit the multicast data flow using Default MDT.

Examples described herein may also provide a method including receiving, by a network controller and from one or more tail nodes connected to receiving devices, a communication including a list of multicast data flows to which each receiving device subscribes. The method further includes storing, by the network controller, the list of multicast data flows to which each receiving device subscribes. Further, the method may include receiving, by the network controller and from a head node connected to a source device transmitting data in a first multicast data flow using Default Multicast Distribution Tree (MDT), a request for an assignment of a data MDT. The method further includes determining, by the network controller, a Data MDT assignment for the first multicast data flow, and storing, by the network controller, a record of the Data MDT assignment for the first multicast data flow including a list of each receiving device subscribing to the first multicast data flow.

In some instances, the method may also include control plane signaling that is used to communicate to the network controller a local join state from each tail node connected to receiving devices of a multicast data flow.

In some cases, determining the Data MDT assignment further includes receiving, by the network controller, a list of tail nodes connected to receiving devices of the first multicast data flow, determining, by the network controller, a list of one or more Data MDT tunnels that have all the tail nodes connected to receiving devices of the first multicast data flow already participating in at least one multicast data flow through the one or more Data MDT tunnels, and determining, by the network controller and from the list of one or more Data MDT tunnels, a first Data MDT runnel with a least amount of tail nodes connected to receiving devices that do not participate in the first multicast data flow.

In some implementation, the method further includes, determining that the first Data MDT tunnel already contains a maximum number of multicast data flows that the first Data MDT tunnel is capable of containing, and determining a second Data MDT tunnel with a second least amount of tail nodes connected to receiving devices that do not participate in the first multicast data flow, and assigning, by the network controller, the first multicast data flow to the second Data MDT tunnel.

In some cases, the method also includes analyzing an allocation of multicast data flows in available Data MDT tunnels, determining that the allocation of the multicast data flows in the available Data MDT tunnels is not optimal by determining that a first multicast data flow in a first Data MDT tunnel and a second multicast data flow in a second Data MDT tunnel have a same set of tail nodes, and merging the first multicast data flow and the second multicast data flow into either the first Data MDT tunnel or the second Data MDT tunnel. In various examples, the analyzing is initiated at a user defined time interval.

Example Embodiments

Various implementations of the present disclosure will be described in detail with reference to the drawings, wherein like reference numerals present like parts and assemblies throughout the several views. Additionally, any samples set forth in this application are not intended to be limiting and merely demonstrate some of the many possible implementations.

Typical data-center architectures include interconnected computer networking devices (e.g., routers, switches, etc.) configured to route data traffic to other devices in the architecture. This traffic may include multicast communications among others (unicast, broadcast, etc.). Thus, these networks support an immense number of individual flows of traffic from a source connected to a head node (e.g., a provider edge (PE) router) to one or more receivers connected to one or more tail nodes (e.g., peer PE routers) that use the network for data transfer. Thus, in multicast transmission, the root, or head node connected to a source sends data packets to a subset, or group, of leaf, or tail nodes connected to receivers that subscribe to a multicast group. The multicast data traffic is transmitted through a tunnel formed between the head node, that is connected to the source, and the one or more tail nodes, that are connected to the group of subscribing receivers. This tree like architecture, where the head node is the root of the tree and the tail nodes are the leaves, is known as a Multicast Distribution Tree (MDT). Two types of MDTs exist, Default MDT and Data MDT. As described above, when a virtual routing and forwarding (VRF) is multicast enabled, it must also be associated with a Default MDT. A head node builds a Default MDT to peer tail nodes. Any multicast data traffic offered to the Default MDT is distributed to all tail nodes that are part of the multicast domain, regardless of whether active receivers are in a VRF at that tail node. The second type of MDT is a Data MDT. A Data MDT is instantiated dynamically if a particular multicast data flow meets a requirement for Data MDT, such as exceeding a bandwidth threshold. Once the threshold is exceeded, the head node that is connected to the multicast virtual private network (MVPN) source of the multicast data traffic can switch the source, group (S,G) from the Default MDT to a Data MDT.

When a head node is transmitting a multicast data flow using Default MDT, one problem that arises is that regardless of whether each tail node is connected to a receiver that is interested in the data being sent, each tail node will get the multicast data traffic and if a tail node does not have an interested receiver, the tail node must still process the packets, determine they are not needed, and drop the packets. Data MDT can alleviate this problem since only a subset of interested tail nodes will receive the traffic. However, Data MDT presents its own limitations. Because MDT tunnel creation is always initiated at a head node, when a requirement for switching to a Data MDT has been met, a head node will notify every tail node, over Default MDT, that the particular multicast data flow will be switching to Data MDT so any tail node with an interested receiver, must switch to Data MDT for that multicast data flow. However, the problem this presents is that there is no consideration for whether the tail nodes are even capable of receiving Data MDT or have the capacity to support an additional Data MDT. Thus, this disclosure describes techniques in which each node in a MVPN can communicate their capabilities to their peer nodes when a MVPN is configured. Thus, the head node will know whether each tail node has the capability and capacity to support switching to Data MDT for a multicast data flow, or to continue using Default MDT for the multicast data flow. In particular, a new flag to be carried in an existing Inclusive-Provider Multicast Service Interface Border Gateway Protocol (I-PMSI BGP) message is described that indicates whether a node has the capability to switch to receiving the multicast data flow using Data MDT. In addition to the flag indicating whether a node is capable of receiving Data MDT, the I-PMSI BGP message will also include the capacity for Data MDTs per VRF of the transmitting node.

Each head node in the multicast domain will then have a record of the resources of each tail node in the MVPN. Thus, the head node will only instantiate a number of Data MDTs that is a maximum of the tail node with the least capacity to support Data MDT. For example, if a head node is capable of creating 1000 Data MDT, but the tail node with the least Data MDT capacity is 50, the head node will instantiate no more than 50 Data MDT for data flows for which that tail node subscribes, ensuring that all tail nodes with subscribing receivers are able to join the Data MDT and receive the multicast traffic. If there is a multicast data flow that the 50 Data MDT capacity tail node does not subscribe to, the head node can instantiate a Data MDT for that multicast data flow even if the head node has already instantiated 50 Data MDT tunnels, as the 50 Data MDT capacity tail node is not a limiting entity for that particular multicast data flow.

In addition, techniques herein provide for a way to optimize Data MDT assignments to avoid using unnecessary extra bandwidth consumption and unnecessary processing at tail nodes. Techniques herein also provide for re-optimizing Data MDT assignments periodically as tail nodes with subscribing receivers dynamically join and leave a multicast data flow. A MVPN signaling enhancement to notify tail nodes about overlay to underlay mapping changes is provided for, in order to facilitate a smooth migration from a first underlay group to a second underlay group. Telemetry or other control plane signaling is used to communicate the local join state of tail nodes and existing Data MDT allocations to a network controller that stores the local join states and existing Data MDT allocations.

As described above, initially each source leaf, or head node, will start sending traffic over Default MDT, once the requirements for Data MDT have been met, the head node will request a Data MDT assignment from the network controller. Because each tail node has communicated their local join state to the network controller, the network controller stores a record of all the receivers for a multicast data flow and can optimize a Data MDT assignment to minimize unnecessary bandwidth consumption and unnecessary processing at tail nodes that have no subscribing receivers to the multicast data flow.

When an overlay multicast data flow (S,G) meets the requirements for Data MDT allocation, the head node requests a Data MDT assignment from the network controller. The network controller has a record of tail nodes where there are local subscribing receivers for (S,G). The network controller reviews existing underlay Data MDT assignments to find an optimal existing underlay Data MDT to assign the overlay multicast data flow (S,G). The network controller will determine which underlay Data MDT currently have all the tail nodes with subscribing receivers already participating. From this list, the network controller will look for an underlay Data MDT that has a minimum number of extra tail nodes that are receiving overlay multicast data traffic through the underlay Data MDT, thus minimizing the extra use of unnecessary bandwidth. Other constraints that influence Data MDT allocation, are the total number of allocated underlay groups for a given tail node. For example, if there are tail nodes with subscribing receivers to the multicast data flow which have already been exhausted, are using the maximum number of Data MDT that they have the capacity for, that Data MDT may not be assigned to the multicast data flow (S,G), and the network controller will then look for the Data MDT that has the second minimum number of extra tail nodes receiving multicast traffic. In addition, a user may define other constraints about how to load balance overlay multicast data flows to underlay groups.

When a Data MDT is initially allocated for a multicast data flow (S,G), it is allocated to the best fit at the time as described above. However, overtime as tail nodes join or leave a multicast data flow, the allocation may no longer be optimal. Thus periodically, the multicast data flows may be reassigned to a different Data MDT to re-optimize the overlay multicast data flows to underlay group allocations. The reallocations may occur at a predefined periodic time interval defined by a user or may be triggered by some other user defined event.

To re-optimize, a network controller looks at the current Data MDT assignments and identifies whether there are any redundant Data MDT present. For example, if two or more Data MDT are serving a same set of tail node devices, the controller will merge the multicast data flows from the two or more Data MDT into a single Data MDT. Once the network controller has identified an optimized allocation, the network controller will signal to the head node the multicast data flow(s) that will be re-allocated. The head node will then send a message to the tail nodes with subscribing receivers, informing the tail nodes of the new Data MDT allocation. This process is similar to when a head node switches from using Default MDT to Data MDT, only the head node is switching from using a first Data MDT to a second Data MDT. The tail nodes with subscribing receivers, will then join the new underlay group if they have not joined already, and adjust hardware programming to expect the multicast data flow(s) on the new Data MDT.

FIG. 1 illustrates a system-architecture 100 in which computing devices route traffic, such as multicast traffic, within at least a portion of a service provider network (SPN) 102. The SPN 102 may comprise an array of computing devices, such as gateways, routers, network bridges, modems, wireless access points, networking cables, line drivers, switches, hubs, protocol converters, servers, firewalls, network address translators, multiplexers, network interface controllers, wireless network interface controllers, terminal adapters, and/or the like. In some examples, the SPN 102 comprises a data center or cloud-computing network comprising servers and other network components (e.g., routers, switches, etc.) stored across multiple data centers located across geographic areas. In these instances, the cloud-computing environment may be a distributed network through which users (often customers) may interact via user devices to manage or otherwise interact with service provided by the cloud computing network. The cloud computing network may provide on-demand availability of computing system resources, such as data storage, computing power (e.g., CPU, GPU, etc.), networking, databases, etc., without direct active management by users. In some examples, the cloud computing network may be managed and maintained by a service provider such that users do not have to invest in and maintain the computing infrastructure for their computing resource needs. Generally, a user may be provided access to, or allocated use of, a portion of the computing resources in the cloud computing network. The cloud computing network may scale, such as by spinning up resources or spinning down resources, based on demand for the individual users. The portions of the cloud computing network may be allocated using hardware virtualization such that portions of the cloud computing network can be configured and managed by the user (e.g., security configuration, load balancing configuration, etc.). However, the cloud computing network need not be managed by a service provider, and can be managed by any entity, including the user themselves that run the applications or services.

The SPN 102 includes a head node 104 and multiple tail nodes 106 as is communicatively coupled to a network controller 108 that is capable of pushing data to and pulling data from the nodes in the network, both the head node 104 and each tail node 106. The head node is illustrated connected to a multicast source 110. The tail nodes 106 are connected to a variety of multicast receivers 112. For example, tail node 106(1) is connected to a group of multicast receivers 112(1). Similarly, tail node 106(2) is connected to a group of multicast receivers 112(2), tail node 106(3) is connected to a group of multicast receivers 112(3), and tail node 106(4) is connected to multicast receiver 112(4). Although in a MVPN, any node may serve as a root, or source device and any node may serve as a leaf, or receiving device, FIG. 1 illustrates head node 104 as a source device and tail nodes 106 as receiving device of a multicast data flow for discussion purposes. Each node in the SPN 102 is capable of using Default MDT 114 to transmit and receive multicast traffic. Environment 100 is also shown with a maximum of three Data MDTs available, Data MDT 116(1), Data MDT 116(2), and Data MDT 116(3) available for multicast data flow transmission. The head node 104 is capable of using the Default MDT 114 as well as all three Data MDTs to transmit a multicast data flow. Tail node 106(1) is capable of receiving multicast data traffic using Default MDT 114 as well as two Data MDT, Data MDT 116(1) and Data MDT 116(2). Tail node 106(2) is capable of receiving multicast data traffic using Default MDT 114 and one Data MDT. Tail node 106(3) is capable of receiving multicast data traffic using Default MDT 114 and all the available Data MDT 116. Finally, tail node 106(4) is only capable of receiving multicast data traffic using Default MDT 114. Tail node 106(4) is not Data MDT capable.

When a multicast MVPN is configured, each node will communicate their Data MDT capability and capacity to their peer nodes in the network. In this way, each node will be aware of which nodes support Data MDT and how many Data MDT tunnels each can support. Thus, the head node 104, will be aware of the Data MDT capability and capacity of each of the tail nodes 106 in the MVPN. Initially when the head node 104 connected to the multicast source 110 begins transmitting a multicast data flow, the multicast data flow will be transmitted using Default MDT 114. When a requirement to switch to transmitting the multicast data flow using Data MDT is met, such as reaching a bandwidth threshold, the head node 104 will be able to determine whether to switch to transmitting the multicast data flow using Data MDT, or continue transmitting using Default MDT 114. If multicast receiver 112(4) connected to tail node 106(4) is subscribing receiver to the multicast data flow, head node 104 will make the decision to continue transmitting using Default MDT 114, as tail node 106(4) is not Data MDT capable. However, if there are no subscribing receivers connected to tail node 106(4) Head node 104 may make the decision to switch to transmitting the multicast data flow using Data MDT 116 because tail node 106(1), tail node 106(2), and tail node 106(3) are all Data MDT capable. As long as tail node 106(1), tail node 106(2), and tail node 106(3) have not reached their capacity for Data MDT, the head node 104 will send a message over Default MDT 114, with information including that it will switch to transmitting the multicast data flow using Data MDT and any tail nodes 106 that have subscribing receivers, must also switch to receiving the multicast data flow using Data MDT. The head node 104 will then start a time and after a predetermined amount of time (e.g., 60 seconds) the Head node will 104 will switch to transmitting the multicast data flow using Data MDT (e.g., Data MDT 116(1)).

Alternately or in addition, the network controller 108 can push and pull information regarding Data MDT capability and capacity from each node in the network using telemetry or other control plane signaling. Thus, the network controller 108 has a record of the capability and capacity for Data MDT for each node in the network as well as all currently assigned Data MDT 116 and the tail nodes 106 having local subscribing multicast receivers 112. Thus, when a requirement for switching to Data MDT has been met, the network controller 108 will determine whether all the tail nodes 106 that have subscribing multicast receivers 112 are Data MDT capable and have the Data MDT capacity to switch to using Data MDT 116. The head node 104 will request a Data MDT assignment form the network controller 108, the network controller will determine an optimal Data MDT 116 assignment for the multicast data flow and give the assignment to the head node 104. The head node 104 will then start the process of informing tail nodes 106 with subscribing multicast receivers 112 that it will be switching to the assigned Data MDT, starting a timer, and switching to the assigned Data MDT for the multicast data flow transmission.

Figure 2:
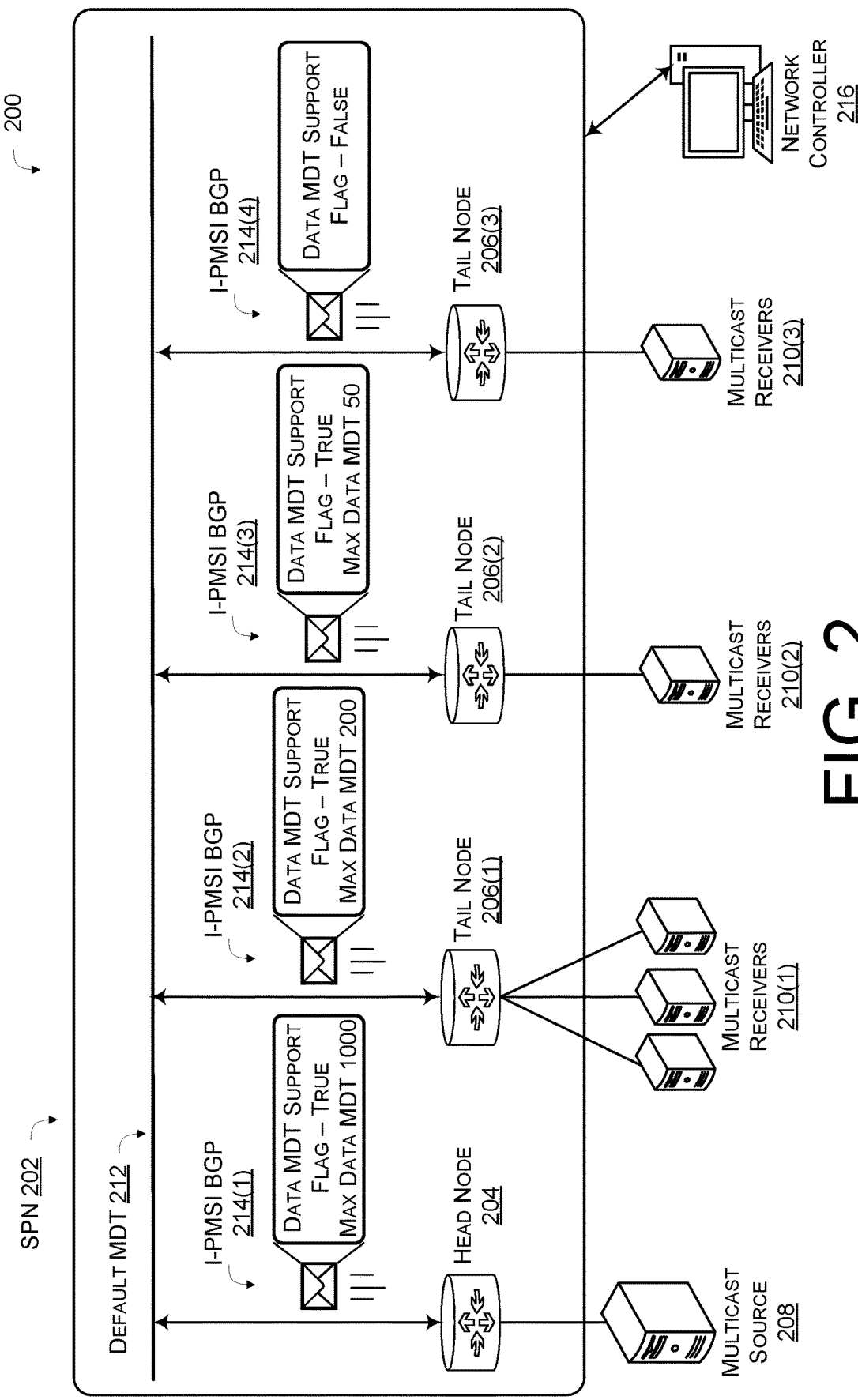
FIG. 2 illustrates an example multicast enabled network environment showing a Data MDT support flags and a maximum Data MDT capacity in a I-PMSI BGP communication over a Default MDT.

FIG. 2 illustrates an example 200 of a partial network 202 similar to the SPN 102 shown in FIG. 1. FIG. 2 include a head node 204 and three tail nodes, tail node 206(1), tail node 206(2) and tail node 206(3). Head node 204 is connected to a multicast source 208. Tail node 206(1) is connected to a group of multicast receivers 210(1), tail node 206(2) is connected to a multicast receiver 210(2), and tail node 206(3) is connected to a multicast receiver 210(3). Each node in the network 202 is capable of transmitting or receiving a multicast data flow using Default MDT 212.

Additionally, FIG. 2 illustrates an I-PMSI message from each node, head node 204 and tail nodes 206, that includes a Data MDT support flag and Data MDT capacity for each node. For example, head node 204 transmits I-PMSI 214(1) that include a Data MDT support flag that is true, indicating that the head node 204 is capable of transmitting and receiving a multicast data flow using Data MDT. I-PMSI 214(1) also include the Data MDT capacity, or total number of Data MDT tunnels that the head node 204 is capable of using. The maximum Data MDT that head node 204 is capable of using is 1000. Similarly, I-PMSI 214(2) sent from tail node 206(1) indicated that tail node 206(1) is Data MDT capable, and can use a maximum of 200 Data MDT. I-PMSI 214(3) indicates that tail node 205(2) is capable of using Data MDT as the Data MDT support flag is set to true, and the maximum number of Data MDT tail node 206(2) can use is 50. I-PMSI 214(4) indicates that tail node 206(3) is not Data MDT capable as the Data MDT Support flag is set to false. Thus, any multicast data flows that multicast receivers 210(3) subscribe to must be transmitted using Default MDT.

When a MVPN is configured, each node in the network, head node 204 and each tail node 206, will announce their Data MDT capability and capacity to their peer nodes by sending the I-PMSI BGP messages as shown over Default MDT. Alternately or in addition, the network controller 216 will store each nodes capability and capacity in a record for reference in order to optimize Data MDT assignments.

FIG. 3A illustrates a record showing each peer PE router in a network and their respective Data MDT capability. The record in FIG. 3A may correspond to a network environment as described above with reference to FIG. 1. The record in FIG. 3A illustrates a network that includes a head node 302 with a Data MDT capability set to true, a tail node 304 with a Data MDT capability set to true, a tail node 306 with a Data MDT capability set to true, a tail node 308 with a Data MDT capability set to true and a tail node 310 with a Data MDT capability set to false. Thus, any multicast data flow for which tail node 310 has subscribing receivers, must be transmitted using Default MDT, as tail node 310 is not capable of using Data MDT. Each peer node in a network (e.g., PE router) has a record similar to the record illustrated in FIG. 3A that indicates the Data MDT capability of each peer node in the network. Alternately or in addition, a network controller, such as the network controller 108 illustrated in FIG. 1, may also stores a record similar to the record illustrated in FIG. 3A. Once a requirement for transmitting a multicast data flow using Data MDT has been met (e.g., a bandwidth threshold has been met), a head node connected to a multicast data source can use a record such as that shown in FIG. 3A to determine whether to continue transmitting multicast data using Default MDT or to switch to transmitting the multicast data flow using Data MDT. If not all tail nodes with subscribing multicast receivers are capable of using Data MDT, the head node will continue transmitting the multicast data flow using Default MDT. For example, if all the tail nodes shown in FIG. 3A have subscribing receivers, the head node 302 will continue transmitting a multicast data flow using Default MDT even if a requirement to switch to Data MDT has been met, because tail node 310 cannot support Data MDT, as indicated by the Data MDT capability flag being set to false as shown in the record. However, if a requirement to switch to transmitting a multicast data flow using Data MDT has been met, and all the tail nodes with subscribing receivers are capable of using Data MDT, the head node may switch to transmitting the multicast data using Data MDT. For example, referring to FIG. 3A, if only tail node 304, tail node 306, and tail node 308 have subscribing receivers for a multicast data flow being transmitted from head node 302, once a requirement for switching to Data MDT is met, head node 302 will send a message indicating that the multicast data flow will switch to a Data MDT in a specified amount of time (e.g., 60 seconds). Each tail node with subscribing receivers, will join the indicated Data MDT and once the specified amount of time has elapsed, the multicast data flow will move from Default MDT to the indicated Data MDT.

FIG. 3B illustrates a record indicating the maximum number of Data MDT tunnels that each peer (e.g., PE router) on a network is capable of supporting. Referring again to FIG. 3A, each peer shown whose Data MDT capability is shown as true, has a corresponding number of maximum Data MDT tunnels that each can support shown in FIG. 3B. For example, head node 302 with a Data MDT capability of true shown in FIG. 3A has a maximum Data MDT tunnel capacity of 100 shown in FIG. 3B. Similarly, each tail node 304, 306, and 308 each having a Data MDT capability set to true, have a maximum Data MDT tunnel capacity of 50, 75, and 60 respectively. Tail nod 310, does not have Data MDT capability, as indicated in FIG. 3A with a flag set to false, thus in FIG. 3B the maximum Data MDT tunnel capacity is shown as 0.

Although head node 302 has the capacity to support 100 Data MDT tunnels, if tail node 310 has subscribing receivers for a particular multicast data flow, head node 302 will not switch from Default MDT to Data MDT. If tail node 310 does not have subscribing receivers, but tail node 304, tail node 306, tail node 308 have subscribing receivers, the maximum Data MDT tunnels head node 302 will instantiate will be the maximum number of Data MDT tunnels that the tail node with the least amount of Data MDT capacity supports. In this case, tail node 304 has the least capacity at 50 Data MDT tunnels. Similar to the records illustrated in FIG. 3A, each peer node in a network (e.g., PE router) stores a record similar to the record illustrated in FIG. 3B that indicates the Data MDT capacity of each peer node in the network. Alternately or in addition, a network controller, such as the network controller 108 illustrated in FIG. 1, may also stores a record similar to the record illustrated in FIG. 3B.

Figure 4:
FIG. 4 illustrates a table depicting Data MDT assignment optimization.

FIG. 4 illustrates an example Data MDT assignment table 400 storing information used by a network controller (e.g., the network controller 108 described in FIG. 1) when a new overlay multicast data flow needs to be assigned to an underlay Data MDT tunnel. The example table illustrates underlay Data MDT tunnels that contain one or more overlay multicast data flows, and at which leaf nodes those overlay multicast data flows have an active subscribing receiver. A "1" represents a leaf node with an active subscribing receiver for an overlay multicast data flow through an underlay Data MDT tunnel, and a "0" represent a leaf node with no active subscribing receiver for an overlay multicast data flow through an underlay Data MDT tunnel. For example, the underlay Data MDT tunnel 402 contains one or more overlay multicast data flows that have active subscribing receivers at leaf node 410 and leaf node 414. The underlay Data MDT tunnel 404 contains one or more overlay multicast data flows that have active subscribing receivers at leaf node 412, leaf node 414, leaf node 416, and leaf node 418. The underlay Data MDT tunnel 406 contains one or more overlay multicast data flows that have active subscribing receivers at leaf node 410, leaf node 412, leaf node 416, and leaf node 418. Finally, the underlay Data MDT tunnel 408 contains one or more overlay multicast data flows that have active subscribing receivers at leaf node 410, leaf node 412, leaf node 414, and leaf node 416. FIG. 4 also illustrates a new multicast data flow (S,G) 420 that needs a Data MDT assignment from a network controller, such as network controller 108 in FIG. 1. When assigning a multicast data flow to a Data MDT tunnel, the network controller seeks to optimize the allocation by minimizing unnecessary extra bandwidth consumption and unnecessary processing at leaf nodes that have no subscribing receivers to the multicast data flow. The network controller reviews the existing Data MDT tunnel assignments to find an optimal existing Data MDT tunnel to assign the multicast data flow (S,G) 420. As shown in FIG. 4, the new multicast data flow (S,G) 420 has active subscribing receivers at leaf node 410, leaf node 412, and leaf node 416. The controller will look for a Data MDT tunnel that transmits data to at least all the leaf nodes to which the new multicast data flow has active subscribing receivers, and the least amount of additional leaf nodes with active subscribing receivers. Thus, Data MDT tunnel 406 already has multicast data flows with active subscribing receivers at all the leaf node (leaf node 410, leaf node 412, and leaf node 416) that multicast data flow (S,G) 420 requires, and no extra leaf nodes. Therefore, the network controller will assign underlay Data MDT tunnel 406 to transmit overlay multicast data flow (S,G) 420. Alternately, if Data MDT tunnel 406 is at maximum capacity, the next optimal tunnel is Data MDT tunnel 408. Data MDT tunnel 408 transmits multicast data flows to all the leaf nodes that multicast data flow (S,G) 420 requires, and Data MDT tunnel 408 has the least amount of extra leaf nodes, only leaf node 414, resulting is the next least amount of extra bandwidth consumption and extra leaf node processing. Leaf node 414 will receive the multicast data flow (S,G) 420, process the data, and drop the packets as there are no active subscribing receivers attached to leaf node 414.

Figure 5:
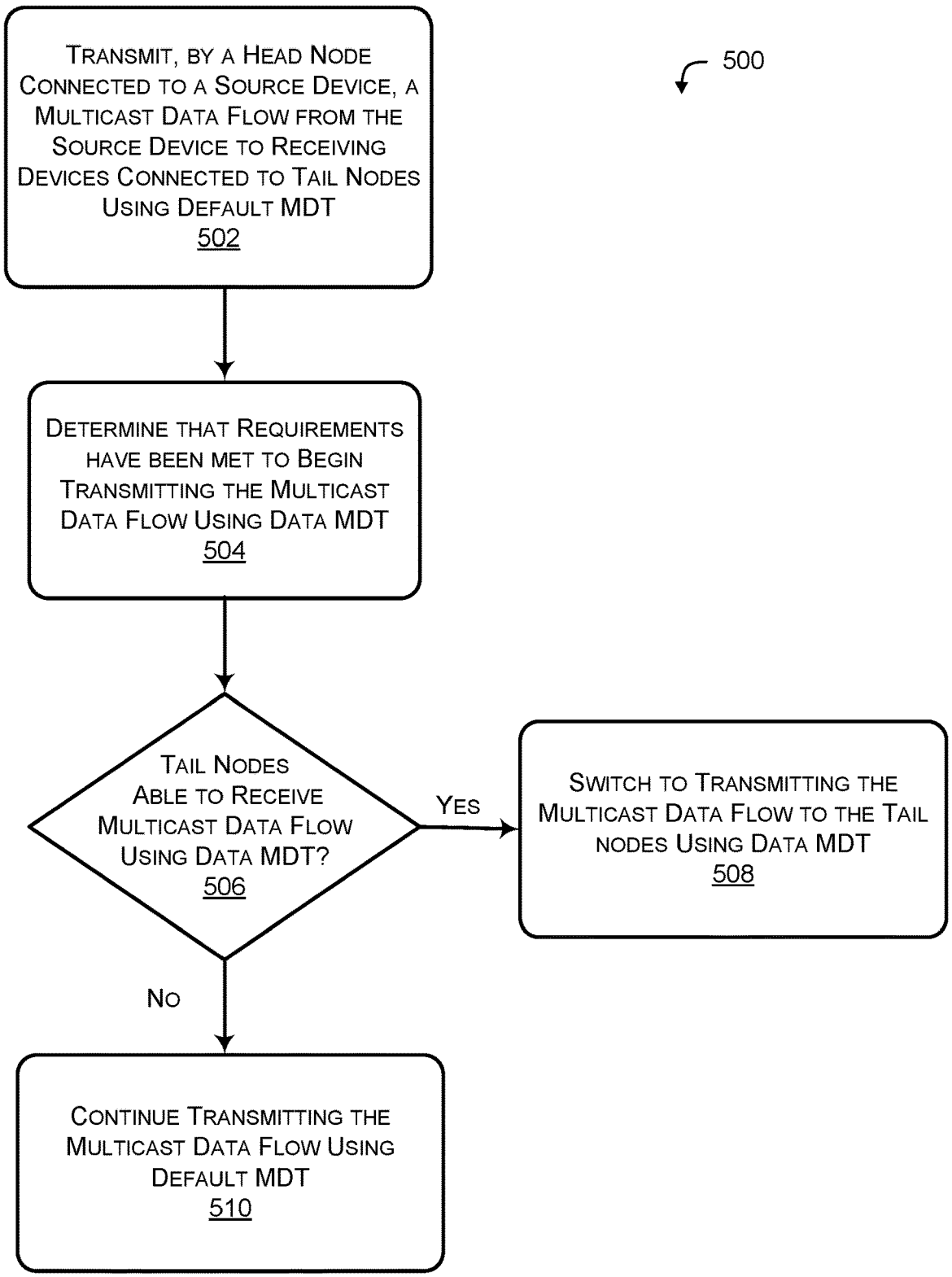
FIG. 5 illustrates an example process for determining whether to switch to transmitting a multicast data flow using Data MDT or continuing transmitting using Default MDT.

FIG. 5 illustrates an example process 500 for determining whether to switch to transmitting a multicast data flow using Data MDT or to continue transmitting the multicast data flow using Default MDT. The process 500 can be performed, at least in part, in a network environment as described above with reference to FIGS. 1-4.

At an operation 502, a head node connected to a source device transmits a multicast data flow from the source device to receiving devices connected to tail nodes using Default MDT. For example, a PE router connected to a MVPN source is initially transmitting a multicast data flow using Default MDT to all the peer PE routers whether the peer PE routers are connected to MVPN receivers that subscribe to the multicast data flow or not. Referring to FIG. 1, the head node 104 connected to the multicast source 110 transmits a multicast data flow to all the tail nodes 106 using Default MDT 114.

At operation 504, the head node determines that requirements have been met to begin transmitting the multicast data flow using Data MDT. For example, there may be criteria such as a bandwidth threshold where once the threshold is exceeded, the requirement for switching to transmitting the multicast data flow using Data MDT is met.

At operation 506, a decision is made whether to switch to transmitting the multicast data flow using Data MDT or to continue transmitting the multicast data flow using Default MDT. For instance, a PE router attached to a MVPN source can determine if each PE router connected to an interested MVPN receiver has the capability and capacity to switch to receiving the multicast data flow using Data MDT or not. An I-PMSI BGP message sent by each tail node device will include a flag indicating whether the tail node device is capable of using Data MDT or not. The I-PMSI BGP message also includes how many total numbers of Data MDT tunnels the tail node device has a capacity to support. The head node device keeps a record of the capability and capacity for each tail node device and whether each tail node device has reached it capacity. Referring to FIG. 2, the I-PMSI BGP 214 messages sent from each node (e.g., head node 204 and each tail node 206) in the network 202 indicate whether a Data MDT support flag is set to true or false for each node, and the maximum Data MDT each node has a capacity to support.

At operation 508, if the tail nodes are able to receive the multicast data flow using Data MDT, the head node switches to transmitting the multicast data flow to the tail nodes using Data MDT. For example, if each PE router connected to a MVPN receiver is capable of using Data MDT and the number of Data MDT tunnels the PE routers have a capacity to support have not been met, the PE router connected to the MVPN source will send out a message that it will be switching to transmitting the multicast data flow using Data MDT, and after a predetermined time, it will switch to transmitting the multicast data flow using Data MDT. For instance, the head node has a record of information such as the tables illustrated in FIG. 3A and FIG. 3B. Referring to the table in FIG. 3A, if the head node 302 is transmitting a multicast data flow to subscribing receivers connected to tail node 304 and tail node 306, the head node 302 will determine that the capability to switch to Data MDT exists. Using the same example and referring to the record in FIG. 3B, the head node 302 will only switch to Data MDT if tail node 304 is currently using less than 50 Data MDT.

At operation 510, if one or more tail nodes are unable to receive multicast data flow using Data MDT, the head node continues to transmit the multicast data flow using Default MDT. For example, if one or more PE routers connected to MVPN receivers are not capable of using Data MDT or the number of Data MDT tunnels that one or more of the PE routers have a capacity for have been met, the PE router connected to a MVPN source will continue to transmit the multicast data flow using Default MDT. Referring again to FIG. 3A if head node 302 is transmitting a multicast data flow to subscribing receivers at tail node 306 and tail node 310, head node 302 will not switch to Data MDT but continue transmitting using Default MDT because tail node 310 has subscribing receivers and is not capable of supporting Data MDT. In another instance, if head node 302 is transmitting a multicast data flow to a subscribing receiver at tail node 304 and tail node 306, but tail node 304 is already using 50 Data MDT, the head node will not switch to Data MDT but continue transmitting the multicast data flow using Default MDT because tail node 304 is already at Data MDT capacity.

Figure 6:
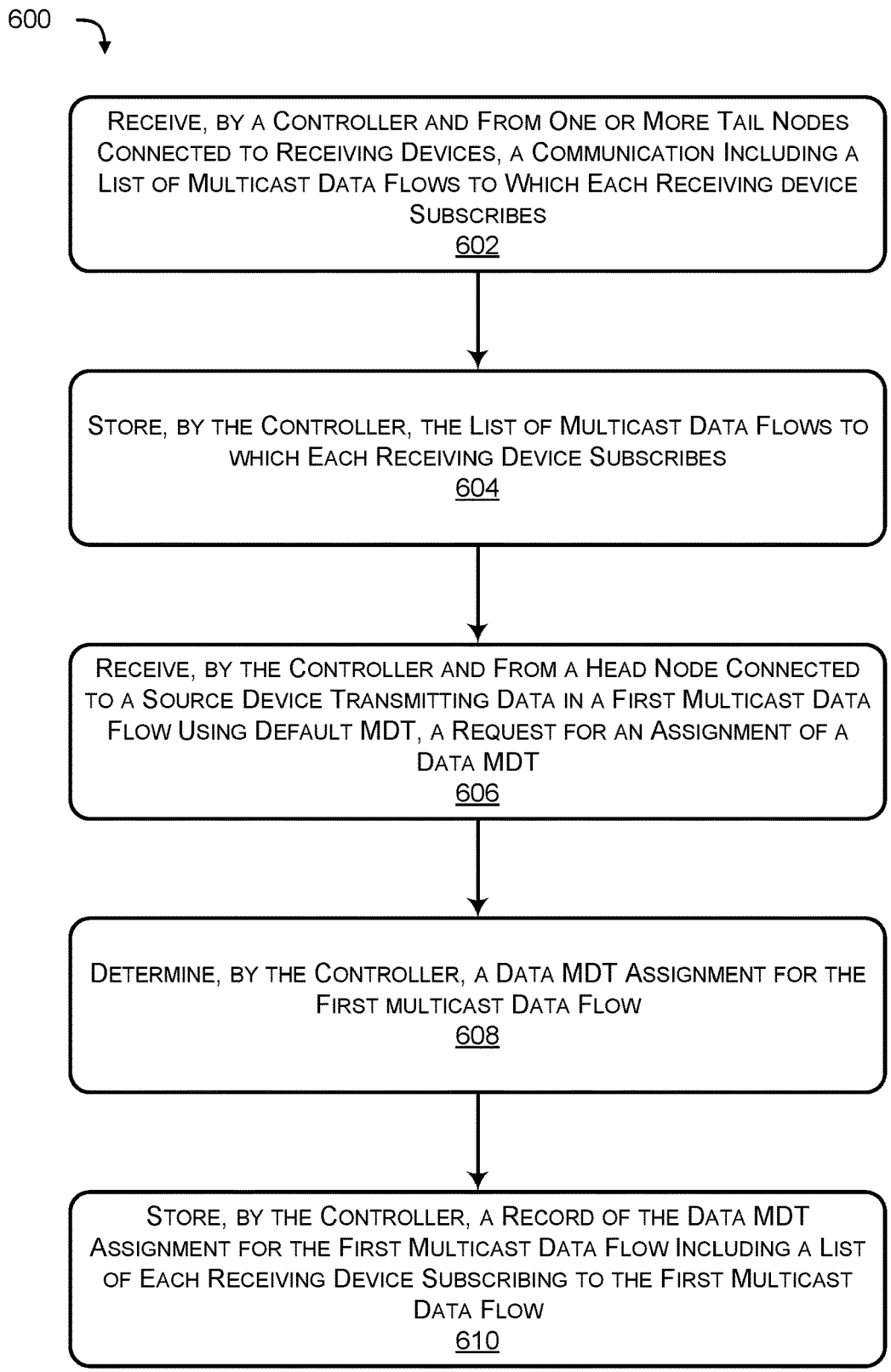
FIG. 6 illustrates an example process for Data MDT assignment optimization.

FIG. 6 illustrates an example process 600 for assigning a Data MDT to a multicast data flow. The process 600 may be performed, at least in part, by a network controller as described above with reference to FIGS. 1-4.

At operation 602, a network controller receives, from one or more tail nodes connected to receiving devices, a communication including a list of multicast data flows to which each receiving device subscribes. For example, the network controller receives information about local join states of multicast receivers connected to PE routers in a MVPN using telemetry or other control plane signaling.

At operation 604, the network controller stores the list of multicast data flows to which each receiving device subscribes. FIG. 4 illustrates a table with example information stored by the network controller. The table illustrates a column for each leaf node in the multicast domain, leaf node 410, leaf node 412, leaf node 414, leaf node 416, and leaf node 418, and a row for each Data MDT tunnel available in the underlay network, Data MDT tunnel 402, Data MDT tunnel 404, Data MDT tunnel 406, and Data MDT tunnel 408. The intersection of column and row indicates with a "1" where there is an active subscribing receiver for one or more overlay multicast data flows in the underlay Data MDT tunnel. If the intersection of the column and row contain a "0", there is no active subscribing receiver for any overlay multicast data flows in the underlay Data MDT tunnel.

At operation 606, the network controller receives, from a head node connected to a source device transmitting data in a first multicast data flow using default MDT, a request for an assignment of a Data MDT. For example, there may be criteria such as a bandwidth threshold where once the threshold is exceeded, the requirement for switching to transmitting the multicast data flow using Data MDT is met, and the head node, such as head node 104 of FIG. 1, will request a Data MDT assignment from the network controller 108.

At operation 608, the network controller determines a Data MDT assignment for the first multicast data flow. Referring to FIG. 4, if the first multicast data flow is (S,G) 420, the network controller will determine an optimal underlay Data MDT tunnel to assign to (S,G) 420, in this example, Data MDT tunnel 406 is optimal because it is already transmitting to leaf node 410, leaf node 412, and leaf node 416 where there are subscribing receivers for (S,G) 420. In addition, Data MDT tunnel 406 does not transmit to any additional leaf nodes, thus no unnecessary bandwidth and hardware processing will be used.

At operation 610, the network controller stores a record of the Data MDT assignment for the first multicast data flow including a list of each receiving device subscribing to the first multicast data flow. The network controller stores the information for future use in determining future Data MDT assignments as well as for periodic reallocation and assignment optimization.

Figure 7:
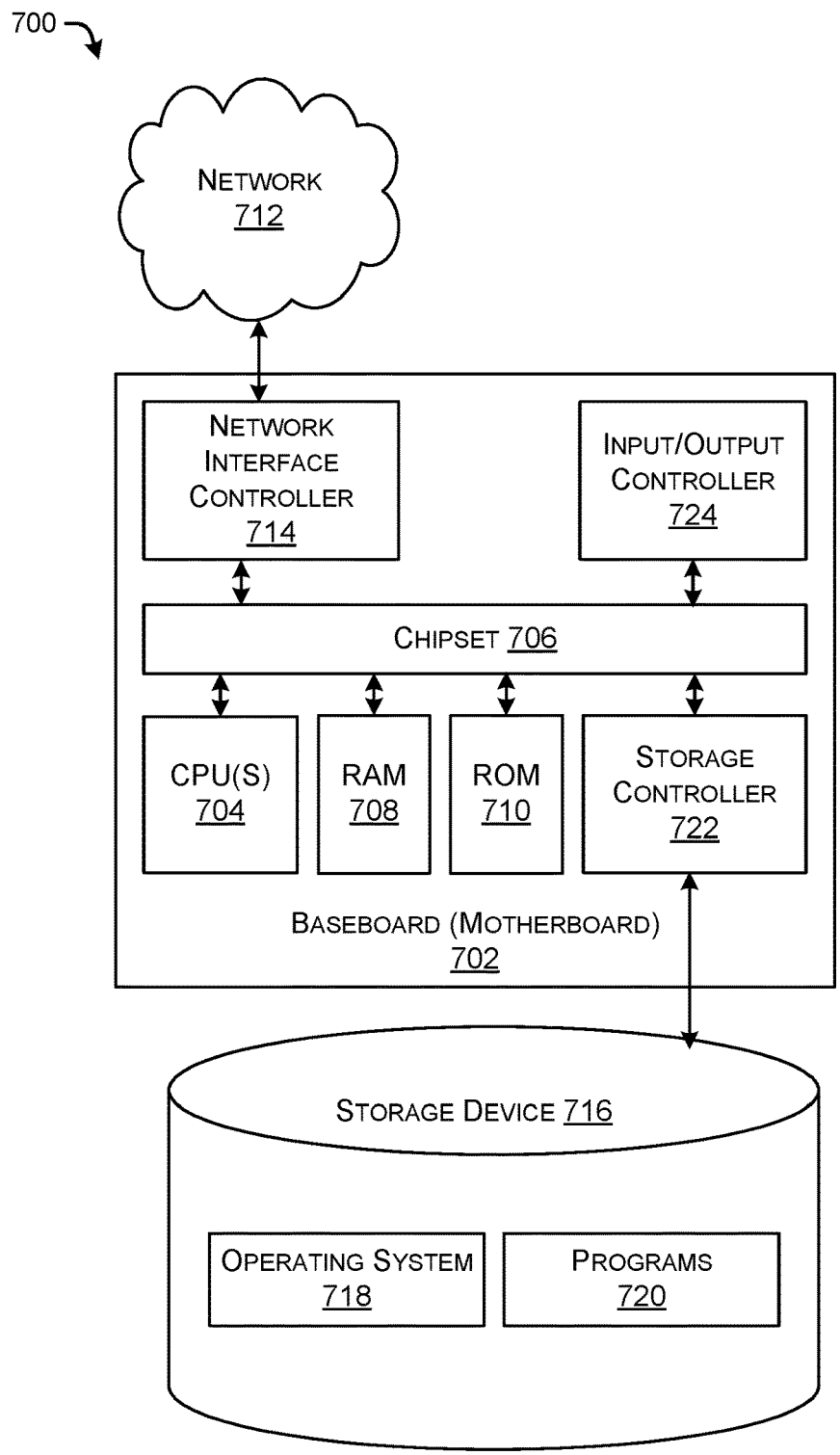
FIG. 7 shows an example computer architecture for a computing device capable of implementing any of the functionality described herein.

FIG. 7 shows an example computer architecture diagram illustrating computer hardware architecture for implementing a device 700 capable of implementing the functionality described herein. The head node 104, all the tail nodes 106, the network controller 108, the multicast source, and all the multicast receivers 112, described above, may include some or all of the components discussed below with reference to the device 700.

The device 700 includes a baseboard 702, or "motherboard," which is a printed circuit board to which a multitude of components or devices can be connected by way of a system bus or other electrical communication paths. In one illustrative configuration, one or more central processing units (CPUs) 704 operate in conjunction with a chipset 706. The CPUs 704 can be standard programmable processors that perform arithmetic and logical operations necessary for the operation of the device 700.

The CPUs 704 perform operations by transitioning from one discrete, physical state to the next through the manipulation of switching elements that differentiate between and change these states. Switching elements generally include electronic circuits that maintain one of two binary states, such as flip-flops, and electronic circuits that provide an output state based on the logical combination of the states of one or more other switching elements, such as logic gates. These basic switching elements can be combined to create more complex logic circuits, including registers, adders-subtractors, arithmetic logic units, floating-point units, and the like.

The chipset 706 provides an interface between the CPUs 704 and the remainder of the components and devices on the baseboard 702. The chipset 706 can provide an interface to a random-access memory (RAM) 708, used as the main memory in the device 700. The chipset 706 can further provide an interface to a computer-readable storage medium such as a read-only memory (ROM) 710 or non-volatile RAM (NVRAM) for storing basic routines that help to startup the device 700 and to transfer information between the various components and devices. The ROM 710 or NVRAM can also store other software components necessary for the operation of the device 700 in accordance with the configurations described herein.

The device 700 can operate in a networked environment using logical connections to remote computing devices and computer systems through a network, such as a local area network 712. The chipset 706 can include functionality for providing network connectivity through a Network Interface Card (NIC) 714, such as a gigabit Ethernet adapter. The NIC 714 is capable of connecting the device 700 to other computing devices over the network. It should be appreciated that multiple NICs 714 can be present in the device 700, connecting the computer to other types of networks and remote computer systems.

The device 700 can be connected to a storage device 716 that provides non-volatile storage for the computer. The storage device 716 can store an operating system 718, programs 720, and data, which have been described in greater detail herein. The storage device 716 can be connected to the device 700 through a storage controller 722 connected to the chipset 706. The storage device 716 can consist of one or more physical storage units. The storage controller 722 can interface with the physical storage units through a serial attached SCSI (SAS) interface, a serial advanced technology attachment (SATA) interface, an FC interface, or other type of interface for physically connecting and transferring data between computers and physical storage units.

The device 700 can store data on the storage device 716 by transforming the physical state of the physical storage units to reflect the information being stored. The specific transformation of physical state can depend on various factors, in different embodiments of this description. Examples of such factors can include, but are not limited to, the technology used to implement the physical storage units, whether the storage device 716 is characterized as primary or secondary storage, and the like.

For example, the device 700 can store information to the storage device 716 by issuing instructions through the storage controller 722 to alter the magnetic characteristics of a particular location within a magnetic disk drive unit, the reflective or refractive characteristics of a particular location in an optical storage unit, or the electrical characteristics of a particular capacitor, transistor, or other discrete component in a solid-state storage unit. Other transformations of physical media are possible without departing from the scope and spirit of the present description, with the foregoing examples provided only to facilitate this description. The device 700 can further read information from the storage device 716 by detecting the physical states or characteristics of one or more particular locations within the physical storage units.

In addition to the storage device 716 described above, the device 700 can have access to other computer-readable storage media to store and retrieve information, such as program modules, data structures, or other data. It should be appreciated by those skilled in the art that computer-readable storage media is any available media that provides for the non-transitory storage of data and that can be accessed by the device 700.

By way of example, and not limitation, computer-readable storage media can include volatile and non-volatile, removable and non-removable media implemented in any method or technology. Computer-readable storage media includes, but is not limited to, RAM, ROM, erasable programmable ROM (EPROM), electrically-erasable programmable ROM (EEPROM), flash memory or other solid-state memory technology, compact disc ROM (CD-ROM), digital versatile disk (DVD), high definition DVD (HD-DVD), BLU-RAY, or other optical storage, magnetic cassettes, magnetic tape, magnetic disk storage or other magnetic storage devices, or any other medium that can be used to store the desired information in a non-transitory fashion.

As mentioned briefly above, the storage device 716 can store an operating system 718 utilized to control the operation of the device 700. According to one embodiment, the operating system comprises the LINUX™ operating system. According to another embodiment, the operating system includes the WINDOWS™ SERVER operating system from MICROSOFT Corporation of Redmond, Washington. According to further embodiments, the operating system can comprise the UNIX™ operating system or one of its variants. It should be appreciated that other operating systems can also be utilized. The storage device 716 can store other system or application programs and data utilized by the device 700.

In one embodiment, the storage device 716 or other computer-readable storage media is encoded with computer-executable instructions which, when loaded into the device 700, transform the computer from a general-purpose computing system into a special-purpose computer capable of implementing the embodiments described herein. These computer-executable instructions transform the device 700 by specifying how the CPUs 704 transition between states, as described above. According to one embodiment, the device 700 has access to computer-readable storage media storing computer-executable instructions which, when executed by the device 700, perform the various processes described above with regard to FIGS. 1-6. The device 700 can also include computer-readable storage media having instructions stored thereupon for performing any of the other computer-implemented operations described herein.

As illustrated in FIG. 7, the storage device 716 stores programs 720, which may include one or more processes. The process(es) may include instructions that, when executed by the CPU(s) 704, cause the device 700 and- or the CPU9*s*) 704 to perform one or more operations.

The device 700 can also include one or more input/output controllers 724 for receiving and processing input from a number of input devices, such as a keyboard, a mouse, a touchpad, a touch screen, an electronic stylus, or other type of input device. Similarly, an input/output controller 724 can provide output to a display, such as a computer monitor, a flat-panel display, a digital projector, a printer, or other type of output device. It will be appreciated that the device 700 might not include all of the components shown in FIG. 7, can include other components that are not explicitly shown in FIG. 7, or might utilize an architecture completely different than that shown in FIG. 7.

In some instances, one or more components may be referred to herein as "configured to," "configurable to," "operable/operative to," "adapted/adaptable," "able to," "conformable/conformed to," etc. Those skilled in the art will recognize that such terms (e.g., "configured to") can generally encompass active-state components and/or inactive-state components and/or standby-state components, unless context requires otherwise.

As used herein, the term "based on" can be used synonymously with "based, at least in part, on" and "based at least partly on." As used herein, the terms "comprises/comprising/comprised" and "includes/including/included," and their equivalents, can be used interchangeably. An apparatus, system, or method that "comprises A, B, and C" includes A, B, and C, but also can include other components (e.g., D) as well. That is, the apparatus, system, or method is not limited to components A, B, and C.

While the invention is described with respect to the specific examples, it is to be understood that the scope of the invention is not limited to these specific examples. Since other modifications and changes varied to fit particular operating requirements and environments will be apparent to those skilled in the art, the invention is not considered limited to the example chosen for purposes of disclosure, and covers all changes and modifications which do not constitute departures from the true spirit and scope of this invention.

Although the application describes embodiments having specific structural features and/or methodological acts, it is to be understood that the claims are not necessarily limited to the specific features or acts described. Rather, the specific features and acts are merely illustrative some embodiments that fall within the scope of the claims of the application.

The invention claimed is:

1. A method comprising:
   transmitting, by a head node connected to a source device, a multicast data flow from the source device to receiving devices connected to tail nodes using Default Multicast Distribution Tree (MDT);
determining that requirements have been met to begin transmitting the multicast data flow using Data MDT;
receiving, by the head node and from each tail node, a message indicating a maximum number of Data MDT tunnels each tail node is capable of supporting:
based at least in part on the receiving, determining whether all the tail nodes are able to receive the multicast data flow using Data MDT;
in response to determining that all the tail nodes are able to receive the multicast data flow using Data MDT, switch to transmitting the multicast data flow to the tail nodes using Data MDT; or
in response to determining that at least one of the tail nodes is unable to receive the multicast data flow using the Data MDT, continue transmitting the multicast data flow using Default MDT.

2. The method of claim 1, further comprising, determining whether a flag is set in an Inclusive-Provider Multicast Service Interface Border Gateway Protocol (I-PMSI BGP) message from each tail node, the flag indicating whether each tail node supports Data MDT.

3. The method of claim 2, further comprising:
determining that the flag in the I-PMSI BGP message from at least one tail node is not set; and
continuing to transmit the multicast data flow using Default MDT.

4. The method of claim 2, wherein the message indicating the maximum number of Data MDT tunnels each tail node is capable of supporting is the I-PMSI BGP message from each tail node.

5. The method of claim 4, further comprising:
determining that each tail node is currently not using a maximum number of Data MDT tunnels that each tail node is capable of supporting; and
switching from transmitting the multicast data flow using Default MDT to transmitting the multicast data flow using Data MDT.

6. The method of claim 4, further comprising:
determining that at least one tail node is currently using a maximum number of Data MDT tunnels that the at least one tail node is capable of supporting; and
continuing to transmit the multicast data flow using Default MDT.

7. The method of claim 1, further comprising determining a maximum number of Data MDT tunnels that the head node can create, based on a number of available Data MDT tunnels a tail node with a lowest capacity of available Data MDT tunnels, has been created; and
continuing to transmit the multicast data flow using Default MDT.

8. A system comprising:
one or more processors; and
one or more non-transitory computer-readable media storing computer-executable instructions that, when executed by the one or more processors, cause the one or more processors to perform operations comprising:
transmitting, by a head node connected to a source device, a multicast data flow from the source device to receiving devices connected to tail nodes using Default Multicast Distribution Tree (MDT);
determining that requirements have been met to begin transmitting the multicast data flow using Data MDT;
receiving, by the head node and from each tail node, a message indicating a maximum number of Data MDT tunnels each tail node is capable of supporting;
based at least in part on the receiving, determining whether all the tail nodes are able to receive the multicast data flow using Data MDT;
in response to determining that all the tail nodes are able to receive the multicast data flow using Data MDT, switch to transmitting the multicast data flow to the tail nodes using Data MDT; or
in response to determining that at least one of the tail nodes is unable to receive the multicast data flow using the Data MDT, continue transmitting the multicast data flow using Default MDT.

9. The system of claim 8, the operations further comprising, determining whether a flag is set in an Inclusive-Provider Multicast Service Interface Border Gateway Protocol (I-PMSI BGP) message from each tail nodes, the flag indicating whether each tail node supports Data MDT.

10. The system of claim 9, the operations further comprising:
determining that the flag in the I-PMSI BGP message from at least one tail node is not set; and
continuing to transmit the multicast data flow using Default MDT.

11. The system of claim 9, wherein the message indicating the maximum number of Data MDT tunnels each tail node is capable of supporting is the I-PMSI BGP message from each tail node.

12. The system of claim 11, the operations further comprising:
determining that each tail node is currently not using a maximum number of Data MDT tunnels that each tail node is capable of supporting; and
switching from transmitting the multicast data flow using Default MDT to transmitting the multicast data flow using Data MDT.

13. The system of claim 11, the operations further comprising:
determining that at least one tail node is currently using a maximum number of Data MDT tunnels that the at least one tail node is capable of supporting; and
continuing to transmit the multicast data flow using Default MDT.

14. The system of claim 8, the operations further comprising determining a maximum number of Data MDT tunnels that the head node can create, based on a number of available Data MDT tunnels a tail node with a lowest capacity of available Data MDT tunnels, has been created; and
continuing to transmit the multicast data flow using Default MDT.

15. One or more non-transitory computer-readable media storing instructions that, when executed, cause one or more processors to perform operations comprising:
transmitting, by a head node connected to a source device, a multicast data flow from the source device to receiving devices connected to tail nodes using Default Multicast Distribution Tree (MDT);
determining that requirements have been met to begin transmitting the multicast data flow using Data MDT;
receiving, by the head node and from each tail node, a message indicating a maximum number of Data MDT tunnels each tail node is capable of supporting:
based at least in part on the receiving, determining whether all the tail nodes are able to receive the multicast data flow using Data MDT;

in response to determining that all the tail nodes are able to receive the multicast data flow using Data MDT, switch to transmitting the multicast data flow to the tail nodes using Data MDT; or in response to determining that at least one of the tail nodes is unable to receive the multicast data flow using the Data MDT, continue transmitting the multicast data flow using Default MDT.

16. The one or more non-transitory computer-readable media as claim 15 recites, the operations further comprising, determining whether a flag is set in an Inclusive-Provider Multicast Service Interface Border Gateway Protocol (I-PMSI BGP) message from each tail nodes, the flag indicating whether each tail node supports Data MDT.

17. The one or more non-transitory computer-readable media as claim 15 recites, the operations further comprising:
determining that the flag in the I-PMSI BGP message from at least one tail node is not set; and
continuing to transmit the multicast data flow using Default MDT.

18. The one or more non-transitory computer-readable media as claim 16 recites, wherein the message indicating the maximum number of Data MDT tunnels each tail node is capable of supporting is the I-PMSI BGP message from each tail node.

19. The one or more non-transitory computer-readable media as claim 18 recites, the operations further comprising:
determining that each tail node is currently not using a maximum number of Data MDT tunnels that each tail node is capable of supporting; and
switching from transmitting the multicast data flow using Default MDT to transmitting the multicast data flow using Data MDT.

20. The one or more non-transitory computer-readable media as claim 18 recites, the operations further comprising:
determining that at least one tail node is currently using a maximum number of Data MDT tunnels that the at least one tail node is capable of supporting; and
continuing to transmit the multicast data flow using Default MDT.

* * * * *